(No Model.)

J. R. VANCE.
TUBE CUTTER.

No. 380,777. Patented Apr. 10, 1888.

WITNESSES:

INVENTOR.
James R. Vance
BY
Drull, Laass & Drull.
ATTORNEYS.

UNITED STATES PATENT OFFICE.

JAMES R. VANCE, OF GENEVA, NEW YORK.

TUBE-CUTTER.

SPECIFICATION forming part of Letters Patent No. 380,777, dated April 10, 1888.

Application filed December 17, 1887. Serial No. 253,145. (No model.)

*To all whom it may concern:*

Be it known that I, JAMES R. VANCE, of Geneva, in the county of Ontario, in the State of New York, have invented new and useful Improvements in Tube-Cutters, of which the following, taken in connection with the accompanying drawings, is a full, clear, and exact description.

This invention consists in a novel construction of a tube-cutting implement which is comparatively inexpensive to manufacture, very convenient and efficient in its operation, and leaves the cut end of the tube in good shape to allow the tube to be withdrawn through the hole in the flue-sheet and for scarfing and welding it.

The invention is fully illustrated in the annexed drawings, in which—

Figure 1:
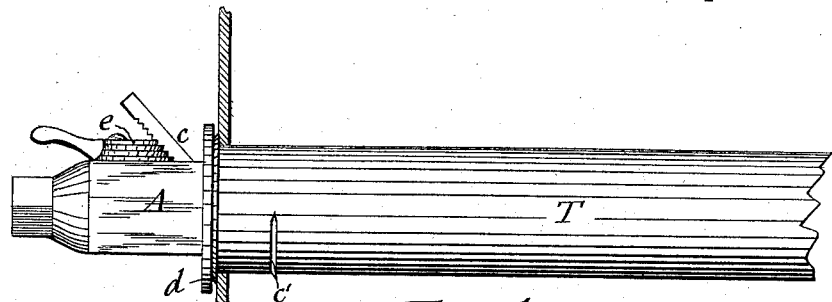
Figure 2:
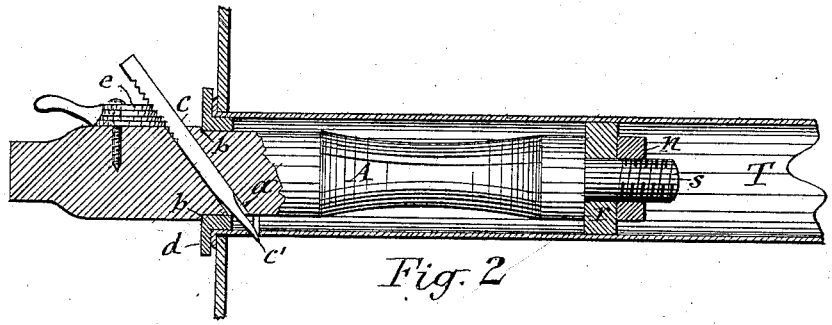
Figure 3:
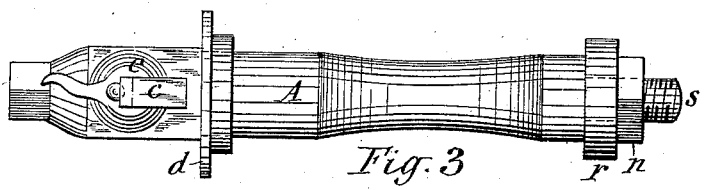
Figure 4:
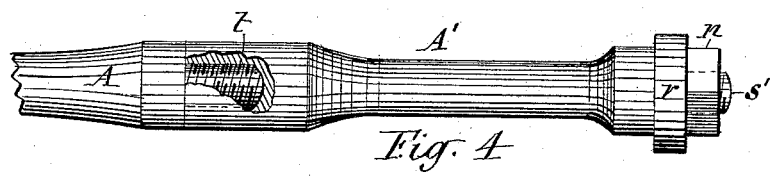
Figure 5:
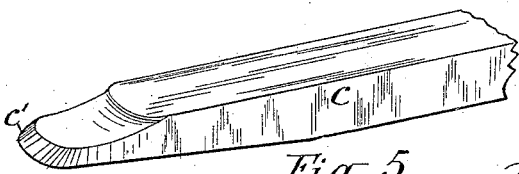

Figure 1 is a side view of a boiler-tube with my improved tube-cutter in position for cutting said tube. Fig. 2 is a longitudinal section of the same. Fig. 3 is a plan view of the tube-cutting implement. Fig. 4 is a plan view of the extension of the mandrel, and Fig. 5 is an enlarged perspective view of that portion of the cutter proper which is provided with the cutting-edge.

Similar letters of reference indicate corresponding parts.

A represents the mandrel, which is adapted to enter endwise into the end of the tube T to be cut. To properly sustain the said mandrel in the tube, and at the same time allow it to freely rotate, I form the mandrel with a circumferential shoulder, $b$, and journal on the mandrel a collar, $d$, which in the operation of the implement rests against the end of the tube T and abuts against the shoulder $b$, as shown in Figs. 1 and 2 of the drawings. The inner end of the mandrel I provide with a screw-threaded stud, $s$, on which is journaled a roller, $r$, which is of approximately the same diameter as the interior of the tube and is retained on the stud by a nut, $n$.

Diagonally through the mandrel A from the outer side of the collar $d$ to the inner side thereof is extended a channel, $a$, and through this channel is extended the cutter proper, $c$, consisting of a straight bar fitted closely to the interior of the channel, and having on the end which is inside of the tube T a rounded chisel-pointed cutting-edge, $c'$. The shank or opposite end of the cutter $c$ is serrated, and on the mandrel is pivoted an eccentric, $e$, having a serrated face engaging the shank of the cutter and holding the same in its adjusted position. The outer end of the mandrel is squared for the application of a wrench by which to revolve the mandrel.

In the operation of my improved tube-cutter the cutter $c$ is to be drawn outward sufficient to bring the cutting-edge $c'$ within the mandrel. Then the latter is introduced into the tube T and brought to rest with its collar $d$ against the end of the tube. Then by a blow or blows of a hammer the cutter C is driven in, so as to cause its cutting-edge to penetrate the side of the tube. Then the eccentric is to be turned to lock the cutter $c$ in its position in the mandrel, and then by turning mandrel the cutter $c$, turning with the mandrel, is caused to sever the tube in one revolution of the mandrel.

The chisel-pointed cutting-edge $c'$ of the inclined cutter $c$ produces a beveled cut on the end of the severed tube, and thereby leaves the same in proper shape to allow it to be removed through the same hole in the flue-sheet in which it was seated, and also in suitable shape for scarfing and welding the said end of the tube.

In operating the described implement through a smoke-box a wrench with a prolonged shank is to be applied to the outer end of the mandrel, and in order to counterbalance this wrench I employ an extension, A', of the mandrel, said extension being provided at one end with a screw-threaded socket, by which it is screwed onto the stud $s$ of the mandrel A in lieu of the roller $r$ and nut $n$. The opposite end of the extension A' is provided with a screw-threaded stud, $s'$, to which are connected the aforesaid roller and nut, as illustrated in Fig. 4 of the drawings.

Having described my invention, what I claim as new, and desire to secure by Letters Patent, is—

1. A tube-cutter composed of the mandrel A, provided with a diagonal channel, $a$, and a cutter, $c$, sustained adjustably longitudinally in said channel to cut the tube inside of the boiler, substantially as shown.

2. A tube-cutter consisting of a mandrel adapted to enter into the tube to be cut, a collar on the mandrel abutting against the end of the tube, a channel extending diagonally through the mandrel from the outer side of the said collar to the inner side thereof, and a cutter sustained adjustably longitudinally in said channel, substantially as described and shown.

3. In combination with the mandrel A, having the channel $a$ extending diagonally through it, the cutter $c$, extending longitudinally through said channel, and a clamp on the mandrel engaging the shank of the cutter and holding the same in its position, as set forth.

4. The combination of the mandrel A, provided with the oblique channel $a$, the cutter $c$, extending through said channel and having its shank serrated, and the eccentric $e$, pivoted to the mandrel and having a serrated face engaging the said shank of the cutter, substantially as described and shown.

In testimony whereof I have hereunto signed my name, in the presence of two witnesses, at Syracuse, in the county of Onondaga, in the State of New York, this 29th day of November, 1887.

JAMES R. VANCE. [L. S.]

Witnesses:
   H. P. DENISON,
   C. L. BENDIXON.